(12) United States Patent
Zhang et al.

(10) Patent No.: US 12,334,492 B2
(45) Date of Patent: Jun. 17, 2025

(54) WINDING DEVICE, WINDING APPARATUS AND WINDING METHOD

(71) Applicant: CONTEMPORARY AMPEREX TECHNOLOGY (HONG KONG) LIMITED, Hong Kong (CN)

(72) Inventors: Xiaowei Zhang, Ningde (CN); Zhiwen Wang, Ningde (CN); Wei Zhang, Ningde (CN); Xiang Wu, Ningde (CN); Yuqian Wen, Ningde (CN); Minghao Tang, Ningde (CN); Shengwu Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/228,434

(22) Filed: Jul. 31, 2023

(65) Prior Publication Data
US 2023/0378513 A1 Nov. 23, 2023

Related U.S. Application Data

(63) Continuation of application No. PCT/CN2022/075096, filed on Jan. 29, 2022.

(51) Int. Cl.
*H01M 10/04* (2006.01)

(52) U.S. Cl.
CPC ... *H01M 10/0409* (2013.01); *H01M 10/0431* (2013.01)

(58) Field of Classification Search
CPC ......... H01M 10/0525; H01M 10/0587; H01M 10/04; H01M 10/0431; H01M 10/0432
See application file for complete search history.

(56) References Cited

U.S. PATENT DOCUMENTS

| | | | | |
|---|---|---|---|---|
| 3,163,374 A | * | 12/1964 | Horn ................. | H01M 10/0409 29/25.42 |
| 4,539,746 A | * | 9/1985 | Sugalski ........... | H01M 10/0409 29/730 |

FOREIGN PATENT DOCUMENTS

| | | |
|---|---|---|
| CN | 109980298 A | 7/2019 |
| CN | 112259807 A | 1/2021 |
| CN | 113224367 A | 8/2021 |
| JP | 2000173646 A | 6/2000 |

OTHER PUBLICATIONS

Machine Translation of: CN 109980298 A, Wuxi Lead Intelligent Equipment Co., Jul. 5, 2019.*

* cited by examiner

*Primary Examiner* — Kenneth J Douyette
(74) *Attorney, Agent, or Firm* — ANOVA LAW GROUP, PLLC (57) ABSTRACT

A winding device includes a pair of outer pins oppositely arranged in a first direction with a periphery for an electrode assembly to wind around, adjusting members configured to reciprocate in a second direction perpendicular to the first direction to drive the pair of outer pins to move away from or close to each other to increase or reduce a distance between the pair of outer pins, a pair of inner pins arranged oppositely in the first direction between the pair of outer pins and configured to move independent of the adjusting members to clamp or release the electrode assembly, and an elastic returning member configured to apply an elastic force in the first direction to at least one of the pair of inner pins such that the pair of inner pins have a tendency to be close to each other.

17 Claims, 6 Drawing Sheets

WINDING DEVICE, WINDING APPARATUS AND WINDING METHOD

CROSS-REFERENCE TO RELATED APPLICATION

This application is a continuation of International Application No. PCT/CN2022/075096, filed on Jan. 29, 2022, the entire content of which is incorporated herein by reference.

TECHNICAL FIELD

The present application relates to the technical field of batteries, and particularly to a winding device, a winding apparatus and a winding method.

BACKGROUND ART

Energy conservation and emission reduction are the key to the sustainable development of the automobile industry. In this case, electric vehicles have become an important part of the sustainable development of the automobile industry due to their advantages in energy conservation and environmental protection. For the electric vehicles, battery technology is an important factor in their development.

An electrode assembly of a battery includes a positive plate, a negative plate and a separator, wherein the positive plate and the negative plate can be wound to form the electrode assembly, and the separator is arranged between the positive plate and the negative plate so as to insulate and separate the positive plate from the negative plate. In a process of manufacturing a wound electrode assembly, the separator, the positive plate and the negative plate are generally arranged on a winding device in a wound manner. During the manufacture of the electrode assembly, the yield of electrode assemblies is low, which results in a low production efficiency of the electrode assemblies.

SUMMARY

An objective of the present application is to provide a winding device, a winding apparatus and a winding method, which may improve the yield of electrode assemblies and increase the production efficiency.

The present application is implemented through technical solutions as follows.

In a first aspect, the present application provides a winding device. The winding device includes: a pair of outer pins, where the pair of outer pins are oppositely arranged in a first direction, and a periphery of the pair of outer pins are used for an electrode assembly to be wound around; adjusting members, where the adjusting members are configured to be capable of reciprocating in a second direction to drive the pair of outer pins to move away from or close to each other, so as to increase or reduce a distance between the pair of outer pins, and the second direction is perpendicular to the first direction; a pair of inner pins, where the pair of inner pins are arranged between the pair of outer pins, the pair of inner pins are oppositely arranged in the first direction, and the pair of inner pins are configured to be capable of moving in a manner of being independent of the adjusting members, so as to clamp or release the electrode assembly; and a first elastic returning member, where the first elastic returning member is configured to apply an elastic force in the first direction to at least one inner pin, such that the pair of inner pins have a tendency to be close to each other.

In the technical solution of an embodiment of the present application, when the winding device in the present application is used to wind an electrode assembly, movement of the pair of inner pins and movement of the adjusting members are driven by a first driving member and a second driving member respectively. The first driving member drives the pair of inner pins to move in the first direction, such that the pair of inner pins clamp or release the electrode assembly. The second driving member drives the adjusting members to move in the second direction, such that the pair of outer pins are driven by the adjusting members to move away from or close to each other in the first direction, so as to change a distance between the pair of outer pins. Before the electrode assembly is wound, the pair of inner pins clamp the electrode assembly under the action of the elastic force of the first elastic returning member, and the second driving member drives the adjusting members to move in the second direction, so as to increase the distance between the pair of outer pins and a winding circumference of the pair of outer pins. After the electrode assembly is wound, the first driving member and the second driving member may be used to drive the pair of inner pins and the adjusting members respectively. The first driving member firstly drives the pair of inner pins to move away from each other to release the electrode assembly. The second driving member then drives the adjusting members to move to enable the pair of outer pins to retract and return to positions having an initial distance, such that the probability that the pair of inner pins still keep in contact with the electrode assembly after the electrode assembly is released is reduced, and the friction force between the pair of inner pins and the electrode assembly is reduced. Further, the winding device may be conveniently separated from the electrode assembly, the probability that the electrode assembly is taken out by the winding device is reduced, a utilization rate of materials is increased, a yield of electrode assemblies is improved, and a manufacturing cost is reduced.

According to some embodiments of the present application, the winding device further includes: a base, where the pair of outer pins and the pair of inner pins are mounted on the base.

In the above solution, the pair of outer pins and the pair of inner pins are all mounted on the base, such that the pair of outer pins and the pair of inner pins are mounted and positioned.

According to some embodiments of the present application, the pair of inner pins include a first inner pin and a second inner pin, the first inner pin is fixed on the base, the second inner pin is movably mounted on the base in the first direction, and the first elastic returning member is used for applying the elastic force to the second inner pin.

In the above solution, the first inner pin is fixed on the base, and the second inner pin is movably mounted on the base in the first direction such that the electrode assembly may be conveniently released or clamped, the structure is simple, and adjustment is convenient. The first elastic returning member applies an elastic force towards the first inner pin to the second inner pin, such that the second inner pin and the first inner pin engage to clamp the electrode assembly, so as to ensure that the electrode assembly may be stably clamped.

According to some embodiments of the present application, the first inner pin and the second inner pin extend in the second direction, a first accommodation cavity is provided on the base, one end of the first inner pin and one end of the second inner pin extend into the first accommodation cavity, and the first elastic returning member is arranged in the first accommodation cavity.

In the above solution, the first accommodation cavity may accommodate the first elastic returning member to protect the first elastic returning member.

According to some embodiments of the present application, a first through hole in communication with the first accommodation cavity is provided on the base, and the first through hole is used for insertion of a first driving member, so as to drive the second inner pin to overcome the elastic force to move.

In the above solution, the first through hole in communication with the first accommodation cavity is provided for convenient insertion of the first driving member, and the second inner pin is driven by the first driving member to move relative to the base in the first direction, so as to release the electrode assembly.

According to some embodiments of the present application, the winding device further includes: a first guiding member, where the first guiding member is fixed in the first accommodation cavity; and a first sliding block, where the first sliding block is slidably connected to the first guiding member in the first direction; and one end of the second inner pin is connected to the first sliding block.

In the above solution, the first sliding block is in sliding fit with the base, and the first sliding block is guided by the first guiding member to move in the first direction, so as to ensure that the first sliding block and the second inner pin may stably move.

According to some embodiments of the present application, the winding device further includes: a first transmission member, where the first transmission member is mounted on the first sliding block and used for engaging with the first driving member, so as to drive the first sliding block to move along the first guiding member.

In the above solution, power of the first driving member is transmitted to the first sliding block by the first transmission member, such that the first sliding block moves in the first direction.

According to some embodiments of the present application, the first transmission member is a first roller, and a first inclined surface matching the first roller is arranged on the first driving member.

In the above solution, the first transmission member is a first roller, and the first roller is in rolling fit with the first driving member such that a driving friction force may be reduced.

According to some embodiments of the present application, the winding device further includes: a pair of supporting frames, where the pair of supporting frames are oppositely arranged in the first direction, and each supporting frame is fixed on the base; and the pair of inner pins are located between the pair of supporting frames, the adjusting members are mounted on the supporting frames, the pair of outer pins correspond to the pair of supporting frames one by one, each outer pin is arranged outside the corresponding supporting frame, and each outer pin is movably connected to the corresponding supporting frame in the first direction.

In the above solution, the outer pins are mounted on the base by means of the supporting frames, and the supporting frames are assembly bases of the outer pins such that the outer pins and the base may be conveniently assembled.

According to some embodiments of the present application, two adjusting members are provided, the two adjusting members correspond to the pair of outer pins one by one, and each adjusting member is movably connected to the corresponding supporting frame in the second direction.

In the above solution, two adjusting members are provided, and the two outer pins are driven by the two adjusting members respectively. The adjusting members are movably connected to the supporting frames in the second direction such that the adjusting members may conveniently drive the outer pins to move in the first direction when the adjusting members move relative to the supporting frames, so as to adjust the distance between the pair of outer pins.

According to some embodiments of the present application, second accommodation cavities are provided on the supporting frames, the adjusting members are slidably arranged in the second accommodation cavities, first sliding slots in communication with the second accommodation cavities are provided on the supporting frames, and the first sliding slots extend in the second direction; and the winding device further includes: second sliding blocks, where the second sliding blocks are movably connected to the supporting frames in the first direction, the outer pins are fixed on the second sliding blocks, second sliding slots corresponding to the first sliding slots are provided on the second sliding blocks, and the second sliding slots are provided in an inclined manner relative to the first sliding slots; and second transmission members, where the second transmission members are connected to the adjusting members and in sliding fit with the first sliding slots and the second sliding slots.

In the above solution, the adjusting members are arranged in the second accommodation cavities so as to ensure that the adjusting members may stably move relative to the supporting frames. The outer pins are connected to the supporting frames by means of the second sliding blocks, such that the outer pins and the supporting frames are assembled, so as to ensure that the outer pins may flexibly and stably move relative to the supporting frames. The adjusting members engages with the second sliding blocks by means of the second transmission members such that when the adjusting members move in the second direction, the second transmission members drive the second sliding blocks and the outer pins to move in the first direction.

According to some embodiments of the present application, the second transmission members are second rollers.

In the above solution, the second transmission members are second rollers, such that friction force of the second transmission members moving in the first sliding slots and the second sliding slots is reduced, and the adjusting members may flexibly move relative to the supporting frames.

According to some embodiments of the present application, at least two second sliding blocks are arranged on each supporting frame, and the at least two second sliding blocks are arranged in a spaced manner in the second direction.

In the above solution, two second sliding blocks are arranged on the supporting frames, such that connecting positions of the outer pins and the supporting frames in the second direction are added, so as to ensure that the outer pins may stably move relative to the supporting frames.

According to some embodiments of the present application, the winding device further includes: blocking members, where the blocking members are fixed on the supporting frames and used for blocking gaps between the second sliding blocks and the supporting frames.

In the above solution, the gaps between the second sliding blocks and the supporting frames are blocked by the blocking members, so as to prevent particles generated through movement of the second transmission members from falling into an inner ring of the electrode assembly from the gaps between the second sliding blocks and the supporting frames and then affecting the quality of the electrode assembly.

According to some embodiments of the present application, the blocking members are magnetic members, and the magnetic members are magnetically attracted to the supporting frames.

In the above solution, the blocking members are magnetic members and may be magnetically attracted and conveniently assembled. The magnetic members may attract particles in the supporting frames, such that the possibility that the particles fall on the electrode assembly is reduced.

According to some embodiments of the present application, a channel extending in the second direction is formed between the pair of supporting frames, and one end of the channel away from the base is used for insertion of a second driving member, so as to drive the adjusting members to move towards the base in the second direction.

In the above solution, the channel extending in the second direction is formed between the pair of supporting frames such that the second driving member is conveniently inserted, so that the adjusting members are driven by the second driving member to move in an axial direction of a winding shaft.

According to some embodiments of the present application, the winding device further includes: a third transmission member, where the third transmission member is fixed on the adjusting members, at least part of the third transmission member is located in the channel, and the third transmission member is used for engaging with the second driving member.

In the above solution, the third transmission member engages with the second driving member to transmit power to the adjusting members, such that the second driving member may conveniently drive the adjusting members to move.

According to some embodiments of the present application, the winding device further includes: a second elastic returning member, where the second elastic returning member is arranged on the supporting frames and used for applying to the adjusting members an elastic force in the second direction and facing away from the base, so as to return the adjusting members.

In the above solution, the second elastic returning member applies the elastic force to the adjusting members, so as to conveniently return the adjusting members.

In a second aspect, the present application provides a winding apparatus. The winding apparatus is used for winding an electrode assembly and includes: a winding device provided in the first aspect; a first driving member, where the first driving member is used for driving the pair of inner pins to move, so as to clamp or release the electrode assembly; and a second driving member, where the second driving member is used for driving the adjusting members to move in the second direction.

In the solution of an embodiment of the present application, the winding apparatus may adjust a winding circumference of the pair of outer pins, a yield of prepared electrode assemblies is high, and a manufacturing cost is low.

According to some embodiments of the present application, the winding apparatus further includes: a detection device, where the detection device is used for obtaining a tab misalignment amount of the electrode assembly; and the first driving member is configured to drive the adjusting members to move according to the tab misalignment amount obtained by the detection device, so as to adjust the distance between the pair of outer pins.

In the above solution, the first driving member drives the adjusting member to move according to the tab misalignment amount obtained by the detection device, so as to automatically adjust the winding circumference of the pair of outer pins.

In a third aspect, the present application provides a winding method. The winding method is used for winding an electrode assembly and includes: obtaining a tab misalignment amount of the electrode assembly; and adjusting a distance between a pair of outer pins according to the tab misalignment amount.

The aforementioned description is merely an overview of the technical solutions of the present application. In order to more clearly understand the technical means of the present application to implement same according to the contents of the description, and in order to make the aforementioned and other objectives, features and advantages of the present application more obvious and understandable, specific implementations of the present application are exemplarily described below.

BRIEF DESCRIPTION OF THE DRAWINGS

In order to illustrate the technical solutions of the embodiments of the present application more clearly, the drawings required in the description of the embodiments of the present application will be introduced briefly below. Obviously, the drawings described below are merely some embodiments of the present application, and for those of ordinary skill in the art, other drawings can also be obtained from these drawings without any creative efforts.

In the accompanying drawings, the figures are not necessarily drawn to scale.

List of reference signs: 100—Winding device; 10—Outer pin; 20—Adjusting member; 30—Inner pin; 31—First inner pin; 32—Second inner pin; 40—First elastic returning member; 50—Base; 51—First accommodation cavity; 52—First through hole; 53—Connecting seat; 61—First guiding member; 62—First sliding block; 63—First transmission member; 70—Supporting frame; 71—Second accommodation cavity; 72—First sliding slot; 73—Third accommodation cavity; 74—Channel; 81—Second sliding block; 811—Second sliding slot; 82—Second transmission member; 83—Stopping member; 84—Third transmission member; 85—Second elastic returning member; 91—Blocking member; 92—First cover plate; 93—Second cover plate; 94—Third cover plate; 200—First driving member; 300—Second driving member; 400—Detection device; 500—Electrode assembly; 501—First electrode plate; 502—Second electrode plate; 503—Separator.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example but should not be used to limit the scope of the present application. That is, the present application is not limited to the described embodiments.

In the description of the present application, it should be noted that "a plurality of" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance. The term "perpendicular" does not mean being perpendicular in the strict sense, but within an allowable range of errors. The term "parallel" does not mean being parallel in the strict sense, but within an allowable range of errors.

The orientation terms in the following description all indicate directions shown in the drawings, but do not limit the specific structure in the present application. In the description of the present application, it should also be noted that the terms "mounting", "connecting", and "connection" should be interpreted in the broad sense unless explicitly defined and limited otherwise. For example, the terms may mean a fixed connection, a detachable connection, or an integral connection, or may mean a direct connection, or an indirect connection by means of an intermediate medium. For those of ordinary skill in the art, the specific meanings of the terms mentioned above in the present application can be construed according to specific circumstances.

In the present application, a battery cell may include a lithium-ion secondary battery, a lithium-ion primary battery, a lithium-sulfur battery, a sodium/lithium-ion battery, a sodium-ion battery or a magnesium-ion battery, etc., which is not limited by the embodiments of the present application.

A battery mentioned in the embodiments of the present application refers to a single physical module including one or more battery cells to provide a higher voltage and capacity. For example, the battery mentioned in the present application may include a battery module, a battery pack, etc. The battery generally includes a case for enclosing one or more battery cells. The case may prevent liquid or other foreign matters from affecting the charging or discharging of the battery cell.

The battery cell includes an electrode assembly and an electrolyte, the electrode assembly is composed of a positive plate, a negative plate and a separator, and the separator is arranged between the positive plate and the negative plate so as to insulate and separate the positive plate from the negative plate. The battery cell operates mainly by relying on movements of metal ions between the positive plate and the negative plate. The positive plate includes a positive current collector and a positive active material layer, a surface of the positive current collector is coated with the positive active material layer, a portion of the current collector that is not coated with the positive active material layer protrudes out of a portion of the current collector that is coated with the positive active material layer, and the portion of the current collector that is not coated with the positive active material layer serves as a positive tab. Taking a lithium-ion battery as an example, the positive current collector may be made of aluminum, and the positive active material may be lithium cobalt oxide, lithium iron phosphate, ternary lithium, lithium manganate, etc. The negative plate includes a negative current collector and a negative active material layer, a surface of the negative current collector is coated with the negative active material layer, a portion of the current collector that is not coated with the negative active material layer protrudes out of a portion of the current collector that is coated with the negative active material layer, and the portion of the current collector that is not coated with the negative active material layer serves as a negative tab. The negative current collector may be made of copper, and the negative active material may be carbon, silicon, etc. In order to ensure that no fusing occurs when a large current passes, there are a plurality of positive tabs which are stacked together, and there are a plurality of negative tabs which are stacked together. The separator may be made of polypropylene (PP), polyethylene (PE), etc.

In a process of preparing a wound electrode assembly, a winding device is generally used to implement the process. For example, one separator is clamped by a clamping mechanism of the winding device, the winding device rotates for at least half a circle, and then a positive plate, the other separator and a negative plate are sequentially wound around the winding device, so as to wind the electrode assembly.

In the prior art, in order to overcome the defect of tab misalignment, the winding device may be manufactured with a variable periphery. The winding device includes a pair of outer pins, adjusting members for adjusting a distance between the pair of outer pins, and a pair of inner pins located between the pair of outer pins. The pair of outer pins are oppositely arranged in a first direction, the pair of inner pins are oppositely arranged in the first direction (such as a radial direction of the winding device), and the adjusting members move in a second direction (such as an axial direction of the winding device) perpendicular to the first direction, so as to adjust the distance between the pair of outer pins. The adjusting members are linked to the pair of inner pins, and the adjusting members and the pair of inner pins share the same driving mechanism. When the distance between the pair of outer pins is increased (that is, a winding circumference of the pair of outer pins is increased), a driving device drives the adjusting members to move in the second direction. With the movement of the adjusting members, the pair of inner pins firstly clamp the electrode assembly (such as a separator), and then the distance between the pair of outer pins is increased. After winding is complemented, the adjusting members move in the second direction, the pair of outer pins firstly retract to positions having an initial distance, and the pair of inner pins then release the electrode assembly. After the pair of outer pins retract to the positions having the initial distance and before the pair of inner pins release the electrode assembly, the electrode assembly clamped by the pair of inner pins is stretched and pulled due to retracting of a winding shaft, such that a friction force between the electrode assembly at an inner ring and the pair of inner pins is large. After the pair of inner pins release the electrode assembly, the pair of inner pins and the electrode assembly are still in contact with each other and have a large friction force therebetween, such that the winding device is likely to take out the electrode assembly at the inner ring when the electrode assembly is pulled out, the pins may not be well pulled out, a yield of electrode assemblies is affected, and even the electrode assembly may be scrapped.

In view of this, in order to solve the problems of a low yield and a low production efficiency of electrode assemblies that are caused by poor pulling of pins by a winding device, the inventor designs a winding device after in-depth research. The winding device includes a pair of outer pins, adjusting members, a pair of inner pins and a first elastic returning member. The pair of outer pins are oppositely arranged in a first direction, and a periphery of the pair of outer pins is used for an electrode assembly to be wound around. The adjusting members are configured to be capable of reciprocating in a second direction to drive the pair of outer pins to move away from or close to each other, so as to increase or reduce a distance between the pair of outer pins, and the second direction is perpendicular to the first direction. The pair of inner pins are configured to be capable of moving in a manner of being independent of the adjusting members, so as to clamp or release the electrode assembly. The first elastic returning member is configured to apply an elastic force in the first direction to at least one inner pin, such that the pair of inner pins have a tendency to be close to each other. Movement of the pair of inner pins and movement of the adjusting members are independent of each other and may be independently driven by two driving members.

When the winding device in the present application is used to wind the electrode assembly, movement of the pair of inner pins and movement of the adjusting members are driven by a first driving member and a second driving member respectively. The first driving member drives the pair of inner pins to move in a first direction, such that the pair of inner pins clamp or release the electrode assembly. The second driving member drives the adjusting members to move in a second direction, such that the pair of outer pins are driven by the adjusting members to move away from or close to each other in the first direction, so as to change a distance between the pair of outer pins. Before the electrode assembly is wound, the pair of inner pins clamp the electrode assembly under the action of the elastic force of the first elastic returning member, and the second driving member drives the adjusting members to move in the second direction, so as to increase the distance between the pair of outer pins and a winding circumference of the pair of outer pins. After the electrode assembly is wound, the first driving member and the second driving member may be used to drive the pair of inner pins and the adjusting members respectively. The first driving member firstly drives the pair of inner pins to move away from each other to release the electrode assembly. The second driving member then drives the adjusting members to move to enable the pair of outer pins to retract and return to positions having an initial distance, such that the probability that the pair of inner pins still keep in contact with the electrode assembly after the electrode assembly is released is reduced, and the friction force between the pair of inner pins and the electrode assembly is reduced. Further, the winding device may be conveniently separated from the electrode assembly, the probability that the electrode assembly is taken out by the winding device is reduced, a utilization rate of materials is increased, a yield of electrode assemblies is improved, and a manufacturing cost is reduced.

Figure 1:
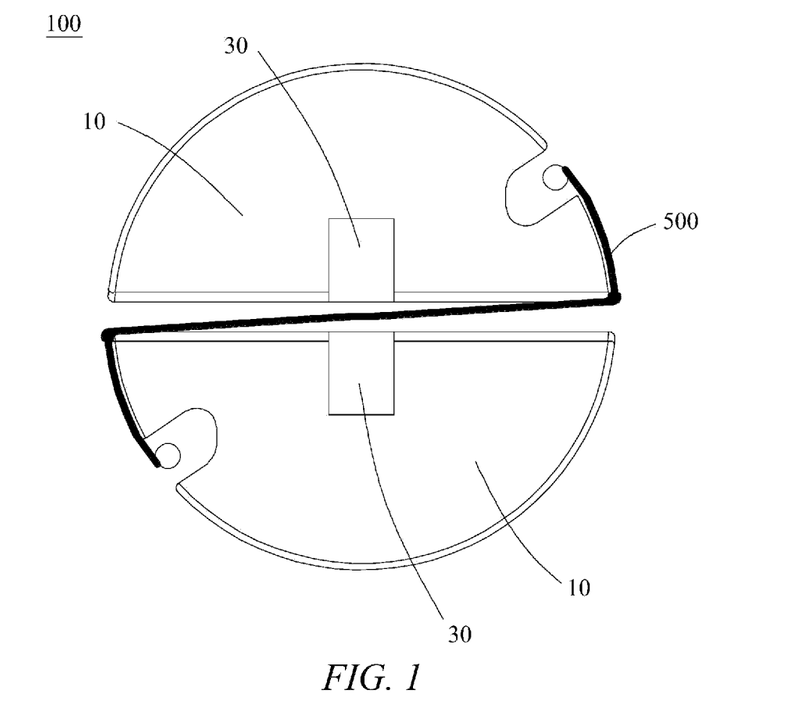
FIG. 1 is a structural diagram of a winding device according to some embodiments of the present application.
Figure 2:
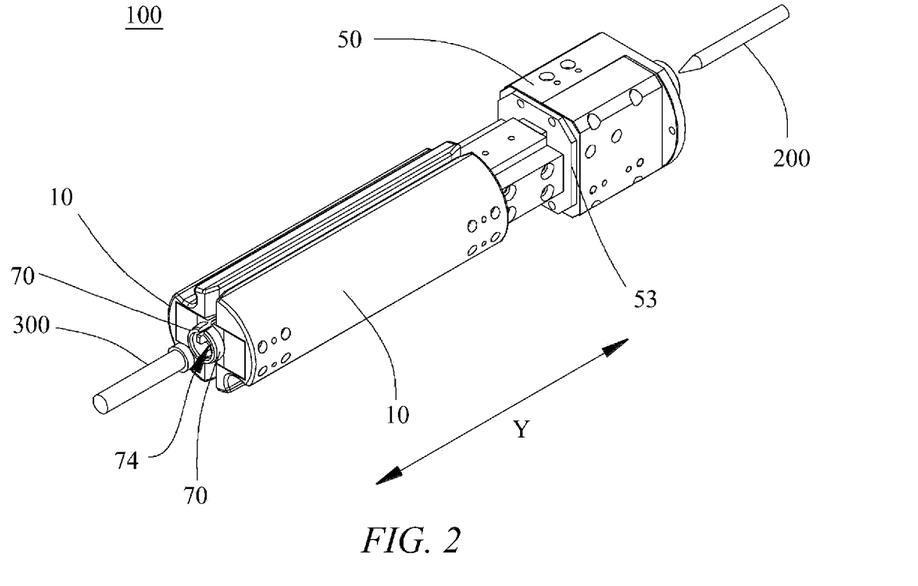
FIG. 2 is a schematic structural diagram of a winding device according to some embodiments of the present application.
Figure 3:
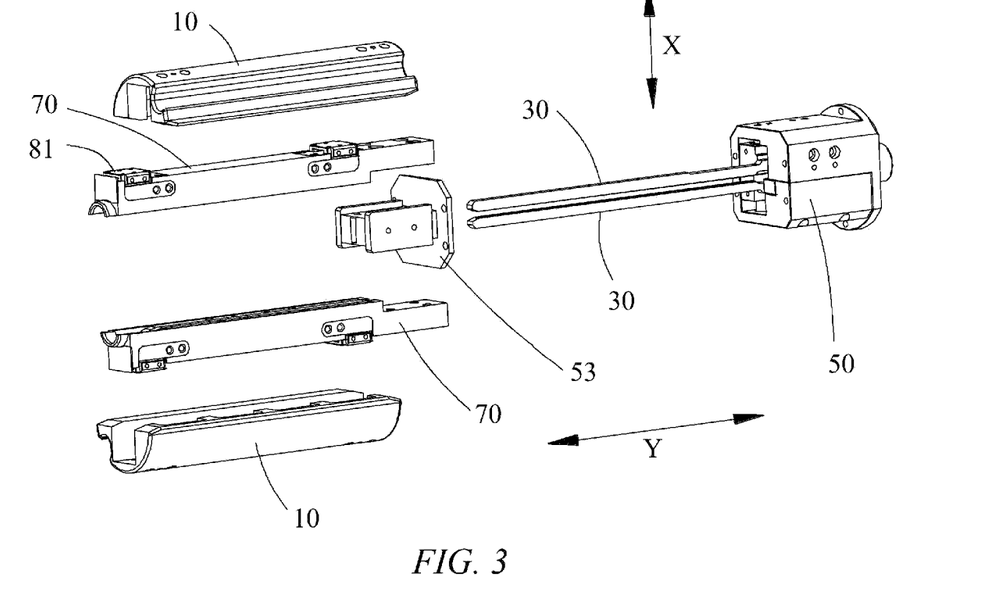
FIG. 3 is an exploded schematic structural diagram of a winding device according to some embodiments of the present application.
Figure 4:
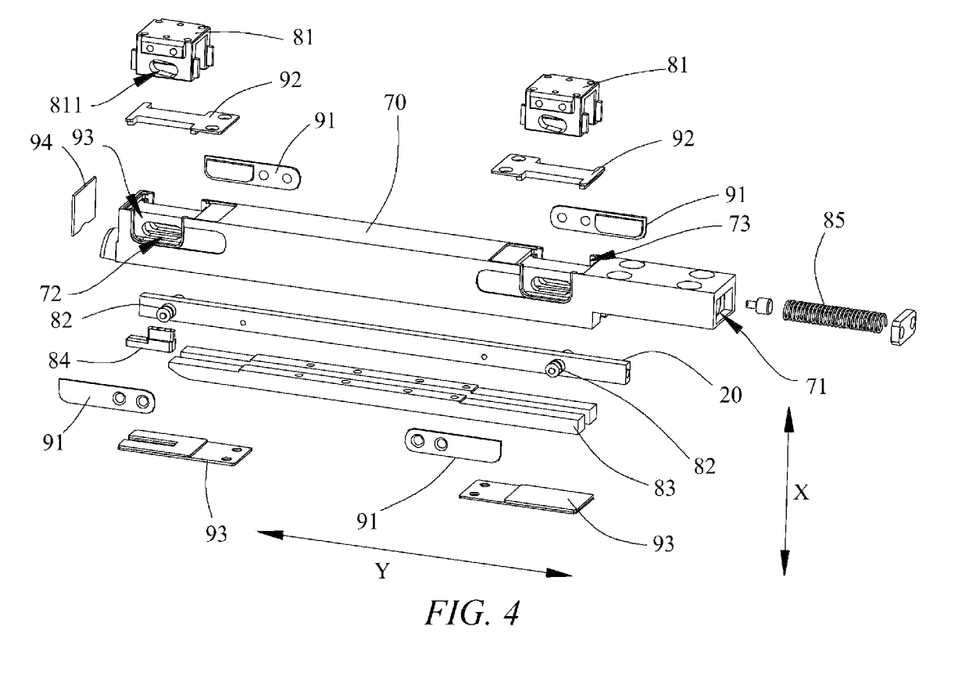
FIG. 4 is a schematic structural diagram of some components of a winding device according to some embodiments of the present application.
Figure 5:
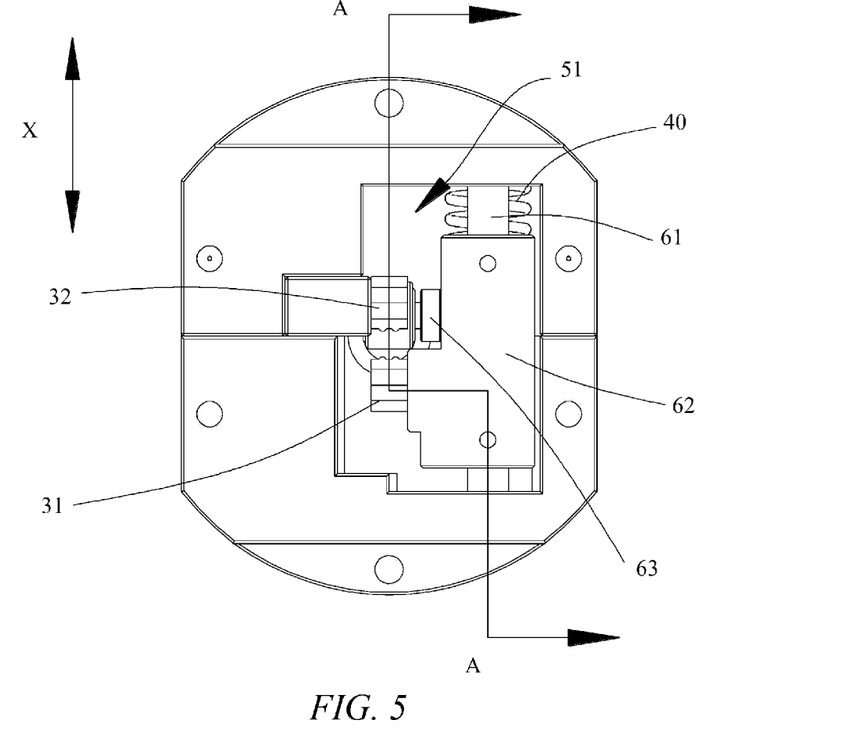
FIG. 5 is a schematic structural diagram of a base according to some embodiments of the present application.
Figure 6:
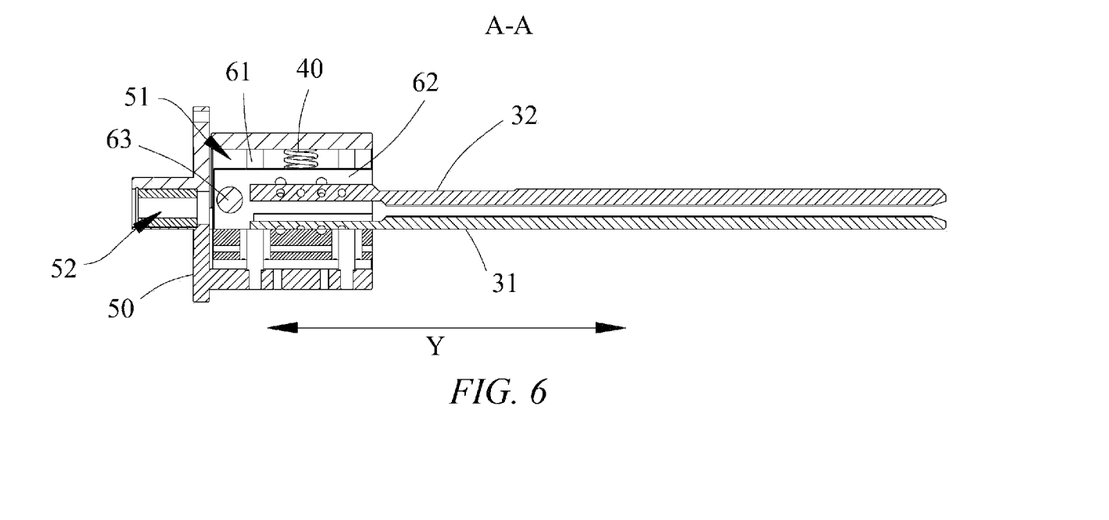
FIG. 6 is a sectional view in a direction A-A in FIG. 5.

With reference to FIGS. 1-6, a structural diagram of a winding device 100 according to some embodiments of the present application is shown in FIG. 1, a schematic structural diagram of a winding device 100 according to some embodiments of the present application is shown in FIG. 2, an exploded schematic structural diagram of a winding device 100 according to some embodiments of the present application is shown in FIG. 3, a schematic structural diagram of some components of a winding device 100 according to some embodiments of the present application is shown in FIG. 4, a schematic structural diagram of a base 50 according to some embodiments of the present application is shown in FIG. 5, and a sectional view in a direction A-A in FIG. 5 is shown in FIG. 6. According to some embodiments of the present application, as shown in FIGS. 1-6, the present application provides a winding device 100. The winding device 100 includes a pair of outer pins 10, adjusting members 20, a pair of inner pins 30 and a first elastic returning member 40. The pair of outer pins 10 are oppositely arranged in a first direction X, and a periphery of the pair of outer pins 10 is used for an electrode assembly 500 to be wound. The adjusting members 20 are configured to be capable of reciprocating in a second direction Y to drive the pair of outer pins to move away from or close to each other, so as to increase or reduce a distance between the pair of outer pins 10, the second direction Y being perpendicular to the first direction X. The pair of inner pins 30 are arranged between the pair of outer pins 10, the pair of inner pins 30 are oppositely arranged in the first direction X, and the pair of inner pins 30 are configured to be capable of moving in a manner of being independent of the adjusting members 20, so as to clamp or release the electrode assembly 500. The first elastic returning member 40 is configured to apply an elastic force in the first direction X to at least one inner pin 30, such that the pair of inner pins 30 have a tendency to be close to each other.

In the figure, a direction indicated by a letter X is the first direction, and a direction indicated by a letter Y is the second direction. The first direction X may be a radial direction of the winding device 100, and the second direction Y may be an axial direction of the winding device.

The pair of outer pins 10 are oppositely arranged in the first direction X, and a gap is provided between the pair of outer pins 10 such that the electrode assembly 500 is conveniently clamped by the pair of inner pins 30 located between the pair of outer pins 10 after the electrode assembly passes through the gap.

The periphery of the pair of outer pins 10 is used for the electrode assembly 500 to be wound, in other words, the electrode assembly 500 is wound around the periphery of the pair of outer pins 10, and the pair of outer pins 10 are winding bases of the electrode assembly 500. If the distance between the pair of outer pins 10 is increased, the winding circumference of the pair of outer pins 10 becomes longer;

and if the distance between the pair of outer pins 10 is reduced, the winding circumference of the pair of outer pins 10 becomes shorter.

When the adjusting members 20 reciprocate in the second direction Y, the adjusting members 20 may drive the pair of outer pins 10 to move away from or close to each other in the first direction X. In the case that the pair of outer pins 10 move away from each other, the distance between the pair of outer pins 10 may be increased; and in the case that the pair of outer pins 10 move close to each other, the distance between the pair of outer pins 10 may be reduced.

The pair of inner pins 30 being configured to be capable of moving in a manner of being independent of the adjusting members 20 means that movement of the pair of inner pins 30 away from or close to each other is independent of movement of the adjusting members 20 in the second direction Y. For example, when the pair of inner pins 30 move away from or close to each other, the adjusting members 20 may not move; or when the adjusting members 20 move in the second direction Y, the pair of inner pins 30 may not move.

The first elastic returning member 40 is a component for providing an elastic force, for example, the first elastic returning member 40 may be a spring, a rubber, etc. The first elastic returning member 40 is configured to apply an elastic force in the first direction X to at least one inner pin 30, such that the pair of inner pins 30 have a tendency to be close to each other. In an initial state, the pair of inner pins 30 may keep a clamping state under the action of the first elastic returning member 40. When the pair of inner pins 30 are required to clamp the electrode assembly 500, it is required to overcome the elastic force to increase the distance between the pair of inner pins 30, enable the electrode assembly 500 to penetrate a position between the pair of inner pins 30, and then enable the pair of inner pins 30 to clamp the electrode assembly 500 under the action of the elastic force of the first elastic returning member 40.

In the technical solution of an embodiment of the present application, when the winding device 100 in the present application is used to wind the electrode assembly 500, movement of the pair of inner pins 30 and movement of the adjusting members 20 are driven by the first driving member and the second driving member respectively. The first driving member drives the pair of inner pins 30 to move in the first direction X, such that the pair of inner pins 30 clamp or release the electrode assembly 500. The second driving member drives the adjusting members 20 to move in the second direction Y, such that the pair of outer pins 10 are driven by the adjusting members 20 to move away from or close to each other in the first direction X, so as to change a distance between the pair of outer pins 10. In the case that the winding circumference of the pair of outer pins 10 is required to be increased, before the electrode assembly 500 is wound, the pair of inner pins 30 clamp the electrode assembly 500 under the action of the elastic force of the first elastic returning member 40, and the second driving member drives the adjusting members 20 to move in the second direction Y, so as to increase the distance between the pair of outer pins 10 and the winding circumference of the pair of outer pins 10. After the electrode assembly 500 is wound, the first driving member and the second driving member may be used to drive the pair of inner pins 30 and the adjusting members 20 respectively. The first driving member firstly drives the pair of inner pins 30 to move away from each other to release the electrode assembly 500. The second driving member drives the adjusting members 20 to move to enable the pair of outer pins 10 to retract and return to positions having an initial distance, thereby reducing the probability that the pair of inner pins 30 still keep in contact with the electrode assembly 500 after the electrode assembly 500 is released, and decreasing a friction force between the pair of inner pins 30 and the electrode assembly 500. Further, the winding device 100 may be conveniently separated from the electrode assembly 500, the probability that the electrode assembly 500 is taken out by the winding device 100 is reduced, a utilization rate of materials is increased, a yield of electrode assemblies 500 is improved, and a manufacturing cost is reduced.

According to some embodiments of the present application, optionally, as shown in FIGS. 2 and 3, the winding device 100 further includes: a base 50, where the pair of outer pins 10 and the pair of inner pins 30 are mounted on the base 50.

The pair of outer pins 10 and the pair of inner pins 30 are all mounted on the base 50, such that the pair of outer pins 10 and the pair of inner pins 30 are mounted and positioned.

According to some embodiments of the present application, as shown in FIGS. 5 and 6, the pair of inner pins 30 include a first inner pin 31 and a second inner pin 32, the first inner pin 31 is fixed on the base 50, the second inner pin 32 is movably mounted on the base 50 in the first direction X, and the first elastic returning member 40 is used for applying the elastic force to the second inner pin 32.

The first inner pin 31 being fixed on the base 50 means that a position of the first inner pin 31 is fixed relative to the base 50, and the first inner pin 31 may be detachably connected to the base 50 by means of a locking member (such as a bolt and a pin), the first inner pin 31 may be fixed on the base 50 by means of a rivet, or the first inner pin 31 may be fixed on the base 50 through welding. Optionally, the first inner pin 31 is connected to the base 50 by means of a bolt.

The second inner pin 32 is movably mounted on the base 50 in the first direction X, and the second inner pin 32 may move relative to the base 50 in the first direction X, so as to change a distance between the second inner pin 32 and the first inner pin 31. The first elastic returning member 40 is used for applying the elastic force to the second inner pin 32, such that the second inner pin 32 has a tendency to move towards the first inner pin 31 in the first direction X.

The first inner pin 31 is fixed on the base 50, and the second inner pin 32 is movably mounted on the base 50 in the first direction X such that the electrode assembly 500 may be conveniently released or clamped, the structure is simple, and adjustment is convenient. The first elastic returning member 40 applies an elastic force towards the first inner pin 31 to the second inner pin 32, such that the second inner pin 32 and the first inner pin 31 engage to clamp the electrode assembly 500, so as to ensure that the electrode assembly 500 may be stably clamped.

According to some embodiments of the present application, as shown in FIGS. 5 and 6, the first inner pin 31 and the second inner pin 32 extend in the second direction Y, a first accommodation cavity 51 is provided on the base 50, one end of the first inner pin 31 and one end of the second inner pin 32 extend into the first accommodation cavity 51, and the first elastic returning member 40 is arranged in the first accommodation cavity 51.

The first inner pin 31 and the second inner pin 32 extend in the second direction Y, that is, a length direction of the first inner pin 31 and a length direction of the second inner pin 32 are the second direction Y.

The first accommodation cavity 51 may accommodate the first elastic returning member 40 to protect the first elastic returning member 40.

According to some embodiments of the present application, optionally, as shown in FIGS. 5 and 6, a first through hole 52 in communication with the first accommodation cavity 51 is provided on the base 50, and the first through hole 52 is used for insertion of the first driving member 200 (with reference to FIG. 2), so as to drive the second inner pin 32 to overcome the elastic force to move.

Optionally, the first through hole 52 may be provided in the second direction Y and has an extending direction the same as that of the first inner pin 31 and the second inner pin 32, which is convenient for operation.

The first through hole 52 in communication with the first accommodation cavity 51 is provided for convenient insertion of the first driving member 200, and the second inner pin 32 is driven by the first driving member 200 to move relative to the base 50 in the first direction X, so as to release the electrode assembly 500.

According to some embodiments of the present application, optionally, as shown in FIGS. 5 and 6, the winding device 100 further includes: a first guiding member 61, where the first guiding member 61 is fixed in a first accommodation cavity 51; and a first sliding block 62, where the first sliding block 62 is slidably connected to the first guiding member 61 in the first direction X, and one end of the second inner pin 32 is connected to the first sliding block 62.

The first guiding member 61 is fixed in the first accommodation cavity 51 and used for guiding the first sliding block 62 to move in the first direction X. The first guiding member 61 may be detachably connected to an inner wall of the first accommodation cavity 51 such that the first guiding member 61 and the base 50 may be conveniently assembled and disassembled. For example, the first guiding member 61 may be mounted on the base 50 by means of a bolt. The first guiding member 61 may be a guiding rod arranged in the first direction X.

The first sliding block 62 is in sliding fit with the base 50, and the first sliding block 62 is guided by the first guiding member 61 to move in the first direction X, so as to ensure that the first sliding block 62 and the second inner pin 32 may stably move.

According to some embodiments of the present application, optionally, as shown in FIGS. 5 and 6, the winding device 100 further includes: a first transmission member 63, where the first transmission member 63 is mounted on the first sliding block 62, and the first transmission member 63 is used for engaging with the first driving member 200, so as to drive the first sliding block 62 to move along the first guiding member 61.

For example, in the case that the first through hole 52 extends in the second direction Y, the first driving member 200 is inserted into the first through hole 52 in the second direction Y, and the first driving member 200 engages with the first transmission member 63. Under the driving of the first driving member 200, the first transmission member 63 drives the first sliding block 62 to move along the first guiding member 61, that is, the first transmission member 63 drives the first sliding block 62 to move in the first direction X.

Power of the first driving member 200 is transmitted to the first sliding block 62 by the first transmission member 63 such that the first sliding block 62 moves in the first direction X.

The first driving member 200 is connected to an actuating end of a linear driving device, the first driving member 200 moves under the driving of the linear driving device, and the linear driving device may be an air cylinder, a hydraulic cylinder or an electric push rod, etc. Optionally, the first driving member 200 and the first transmission member 63 may engage with each other by means of inclined surfaces, and the first transmission member 63 converts movement of the first driving member 200 in the second direction Y into movement of the first sliding block 62 in the first direction X. For example, the first driving member 200 may be a conical rod, and after the first transmission member 63 is in contact with the first driving member 200, the first driving member 200 continues to move, such that the first transmission member 63 drives the first sliding block 62 to move in the first direction X. For another example, a first inclined surface is arranged at an end of the first driving member 200, a second inclined surface matching the first inclined surface is arranged on the first transmission member 63, and after the first inclined surface of the first driving member 200 engages with the second inclined surface, with continuous movement of the first driving member 200, the first transmission member 63 moves in the first direction X.

According to some embodiments of the present application, optionally, the first transmission member 63 is a first roller, and a first inclined surface matching the first roller is arranged on the first driving member 200.

After the first inclined surface matches the first roller, the first roller moves along the first inclined surface, and the first roller is lifted by the first inclined surface, such that the first roller drives the first sliding block 62 to move in the first direction X. The first roller is mounted on the first sliding block 62 by means of a first shaft, and the first roller rotates around the first shaft. When the first driving member 200 engages with the first roller, for example, the first driving member 200 moves in the second direction Y, and as the first driving member 200 goes deep into the first through hole 52, the first roller is lifted by the first driving member 200, so as to drive the first sliding block 62 to overcome the elastic force of the first elastic returning member 40 in the first direction X to move, and further a distance between the first inner pin 31 and the second inner pin 32 is increased.

The first transmission member 63 is a first roller, and the first roller is in rolling fit with the first driving member 200, so as to reduce a driving friction force.

Figure 7:
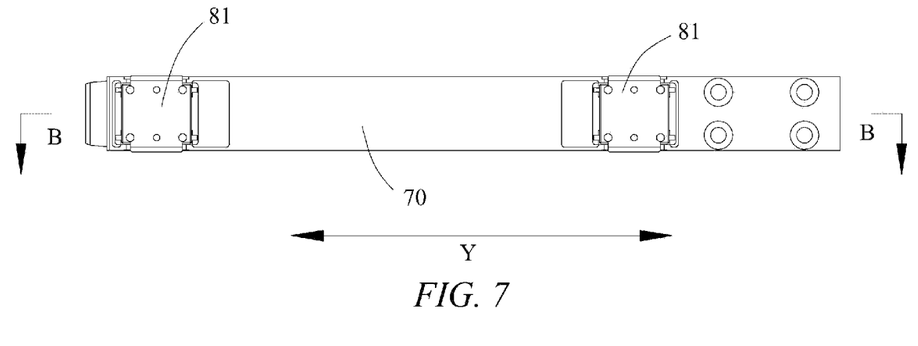
FIG. 7 is a top view of a supporting frame according to some embodiments of the present application.
Figure 8:
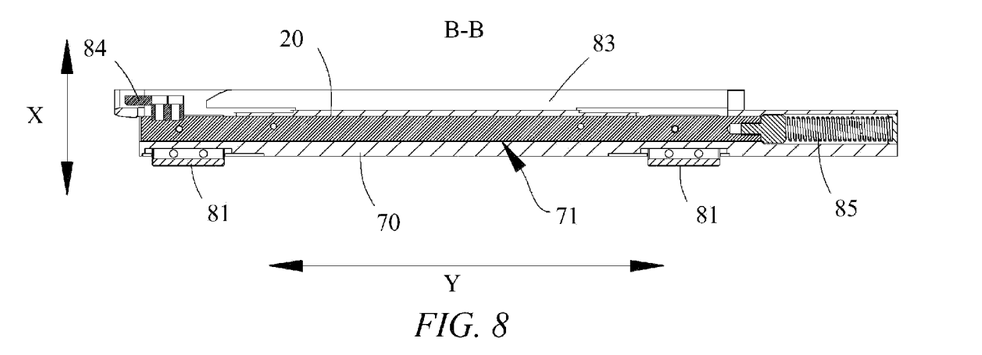
FIG. 8 is a sectional view in a direction B-B in FIG. 7.

With reference to FIGS. 7 and 8, a top view of a supporting frame 70 according to some embodiments of the present application is shown in FIG. 7, and a sectional view in a direction B-B in FIG. 7 is shown in FIG. 8. According to some embodiments of the present application, optionally, as shown in FIGS. 2-4, 7 and 8, the winding device 100 further includes: a pair of supporting frames 70, where the pair of supporting frames 70 are oppositely arranged in the first direction X, and each supporting frame 70 is fixed on the base 50. The pair of inner pins 30 are located between the pair of supporting frames 70, the adjusting members 20 are mounted on the supporting frames 70, the pair of outer pins 10 correspond to the pair of supporting frames 70 one by one, each outer pin 10 is arranged outside the corresponding supporting frame 70, and each outer pin 10 is movably connected to the corresponding supporting frame 70 in the first direction X.

The pair of outer pins 10 correspond to the pair of supporting frames 70 one by one, the pair of inner pins 30 are arranged between the pair of supporting frames 70, and the pair of outer pins 10 correspond to the pair of inner pins 30 one by one.

The outer pins 10 are mounted on the base 50 by means of the supporting frames 70, and the supporting frames 70 are assembly bases of the outer pins 10 such that the outer pins 10 and the base 50 may be conveniently assembled.

According to some embodiments of the present application, optionally, as shown in FIGS. 2 and 3, the winding device 100 further includes a connecting seat 53, and the pair of supporting frames 70 are connected to the base 50 by means of the connecting seat 53.

According to some embodiments of the present application, optionally, two adjusting members 20 are provided, the two adjusting members 20 correspond to the pair of outer pins 10 one by one, and each adjusting member 20 is movably connected to the corresponding supporting frame 70 in the second direction Y.

The two adjusting members 20 correspond to the pair of outer pins 10 one by one, and each adjusting member 20 drives the corresponding outer pin 10 to move.

The two adjusting members 20 are provided, and the two outer pins 10 are driven by the two adjusting members 20 respectively. The adjusting members 20 are movably connected to the supporting frames 70 in the second direction Y such that the adjusting members 20 may conveniently drive the outer pins 10 to move in the first direction X when the adjusting members move relative to the supporting frames 70, and the distance between the pair of outer pins 10 is adjusted.

Figure 9:
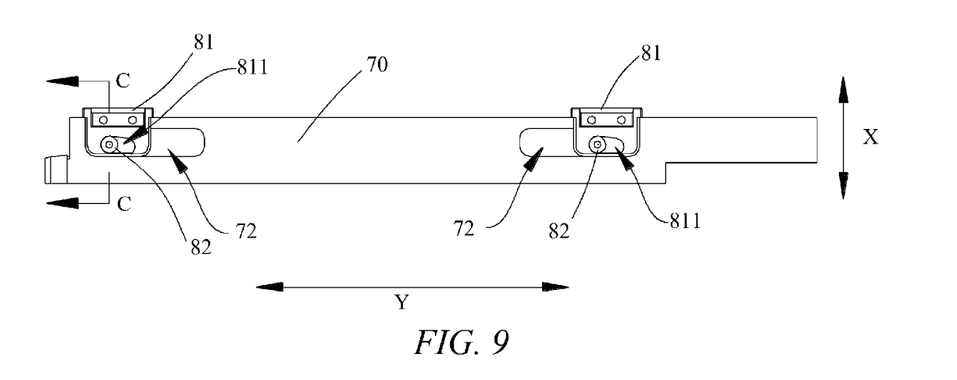
FIG. 9 is a schematic assembly diagram of second sliding blocks and a supporting frame according to some embodiments of the present application.
Figure 10:
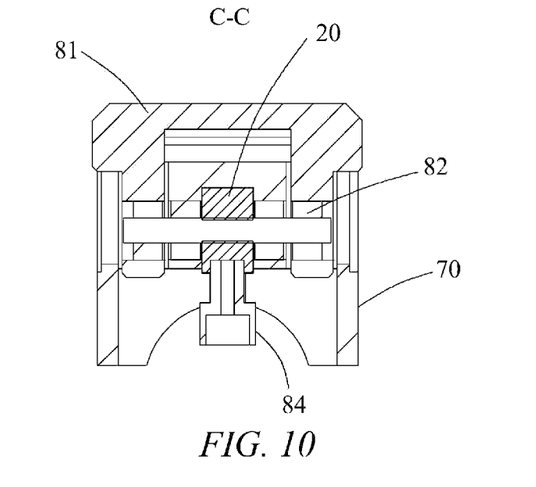
FIG. 10 is a sectional view in a direction C-C in FIG. 9.
Figure 11:
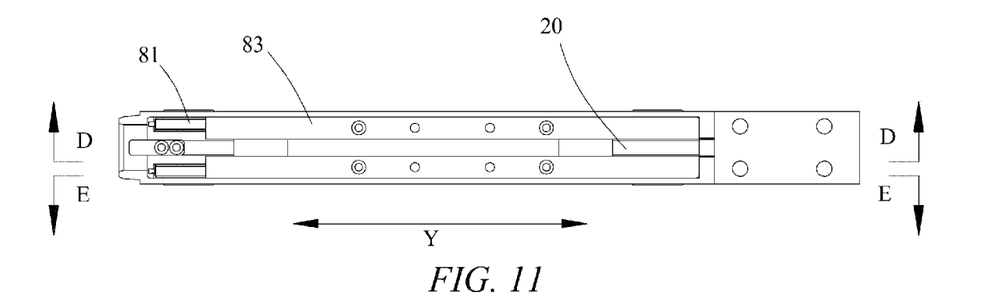
FIG. 11 is a top view of a supporting frame according to some embodiments of the present application.
Figure 12:
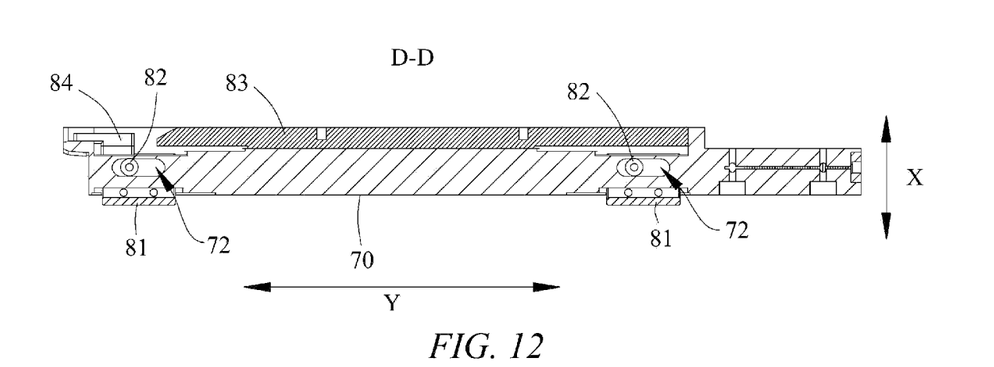
FIG. 12 is a sectional view in a direction D-D in FIG. 11.
Figure 13:
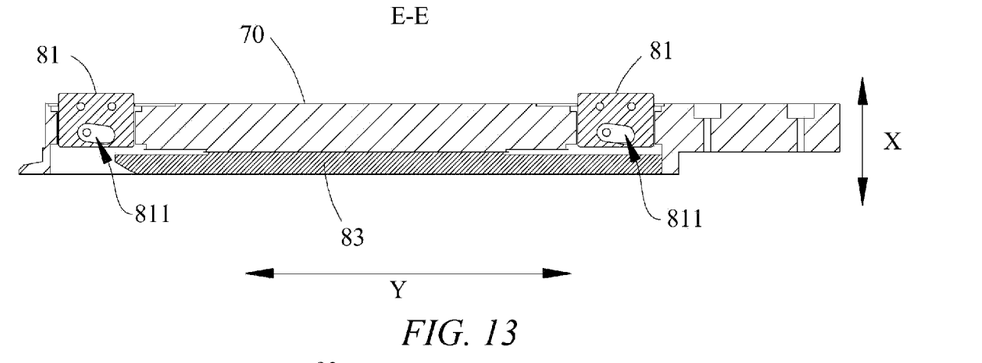
FIG. 13 is a sectional view in a direction E-E in FIG. 11.

With reference to FIGS. 9-13, a schematic assembly diagram of second sliding blocks 81 and a supporting frame 70 according to some embodiments of the present application is shown in FIG. 9, a sectional view in a direction C-C in FIG. 9 is shown in FIG. 10, a top view of a supporting frame 70 according to some embodiments of the present application is shown in FIG. 11, a sectional view in a direction D-D in FIG. 11 is shown in FIG. 12, and a sectional view in a direction E-E in FIG. 11 is shown in FIG. 13. According to some embodiments of the present application, optionally, as shown in FIGS. 8-13, second accommodation cavities 71 are provided on the supporting frames 70, the adjusting members 20 are slidably arranged in the second accommodation cavities 71, first sliding slots 72 in communication with the second accommodation cavities 71 are provided on the supporting frames 70, and the first sliding slots 72 extend in the second direction Y. The winding device 100 further includes: second sliding blocks 81, where the second sliding blocks 81 are movably connected to the supporting frames 70 in the first direction X, the outer pins 10 are fixed on the second sliding blocks 81, second sliding slots 811 corresponding to the first sliding slots 72 are provided on the second sliding blocks 81, and the second sliding slots 811 are provided in an inclined manner relative to the first sliding slots 72; and second transmission members 82, where the second transmission members 82 are connected to the adjusting members 20 and in sliding fit with the first sliding slots 72 and the second sliding slots 811.

The first sliding slots 72 and the second sliding slots 811 are through slots such that the second transmission members 82 may conveniently pass through the first sliding slots 72 and the second sliding slots 811. The second transmission members 82 are separated from the adjusting members 20, and after the adjusting members 20 are mounted in the second accommodation cavities 71, the second transmission members 82 pass through the first sliding slots 72 and the second sliding slots 811 to be connected to the adjusting members 20.

The first sliding slots 72 extend in the second direction Y, and the second sliding slots 811 are provided in an inclined manner relative to the first sliding slots 72. When the adjusting members 20 move in the second direction Y, the adjusting members 20 drive the second transmission members 82 to move along the first sliding slots 72, and meanwhile, the second transmission members 82 move in the second sliding slots 811, such that the second sliding blocks 81 move in the first direction X.

Optionally, the second sliding blocks 81 may be made of a wear-resistant material, so as to reduce particles generated by friction.

The adjusting members 20 are arranged in the second accommodation cavities 71, so as to ensure that the adjusting members 20 may stably move relative to the supporting frames 70. The outer pins 10 are connected to the supporting frames 70 by means of the second sliding blocks 81, such that the outer pins 10 and the supporting frames 70 are assembled, so as to ensure that the outer pins 10 may flexibly and stably move relative to the supporting frames 70. The adjusting members 20 engages with the second sliding blocks 81 by means of the second transmission members 82 such that when the adjusting members 20 move in the second direction Y, the second transmission members 82 drive the second sliding blocks 81 and the outer pins 10 to move in the first direction X.

According to some embodiments of the present application, optionally, the second transmission members 82 are second rollers.

The second rollers are mounted on the adjusting members 20 by means of second shafts, and the second rollers rotate around the second shafts. Each second roller may include two parts that are separately arranged, wherein one part is located in the corresponding first sliding slot 72, and the other part is located in the corresponding second sliding slot 811, such that the second rollers may conveniently slide in the first sliding slots 72 and the second sliding slots 811.

The second transmission members 82 are the second rollers, such that friction force of the second transmission members 82 moving in the first sliding slots 72 and the second sliding slots 811 is reduced, and the adjusting members 20 may flexibly move relative to the supporting frames 70.

Optionally, the second transmission members 82 may be located on two sides of the adjusting members 20 in a third direction, and the third direction is perpendicular to the first direction X and the second direction Y, so as to ensure that the adjusting members 20 may stably move relative to the supporting frames 70.

According to some embodiments of the present application, optionally, as shown in FIGS. 9 and 13, at least two second sliding blocks 81 are arranged on each supporting frame 70, and the at least two second sliding blocks 81 are arranged in a spaced manner in the second direction Y.

The at least two second sliding blocks 81 are arranged in a spaced manner in the second direction Y, and optionally, two second sliding blocks 81 may be located at two ends of each supporting frame 70 in the second direction Y. Optionally, as shown in FIGS. 9 and 13, two second sliding blocks 81 are arranged on each supporting frame 70, and the two second sliding blocks 81 are located at two ends of each supporting frame 70 in the second direction Y.

Two second sliding blocks 81 are arranged on each supporting frame 70, such that connecting positions of the outer pins 10 and the supporting frames 70 in the second direction Y are added, so as to ensure that the outer pins 10 may stably move relative to the supporting frames 70.

According to some embodiments of the present application, optionally, the winding device 100 further includes stopping members. Each stopping member is arranged between each supporting frame 70 and the corresponding inner pin 30, the stopping members are mounted on the supporting frames 70, and each stopping member is used for blocking an opening of the corresponding second accommodation cavity 71 facing the other supporting frame 70.

Figure 14:
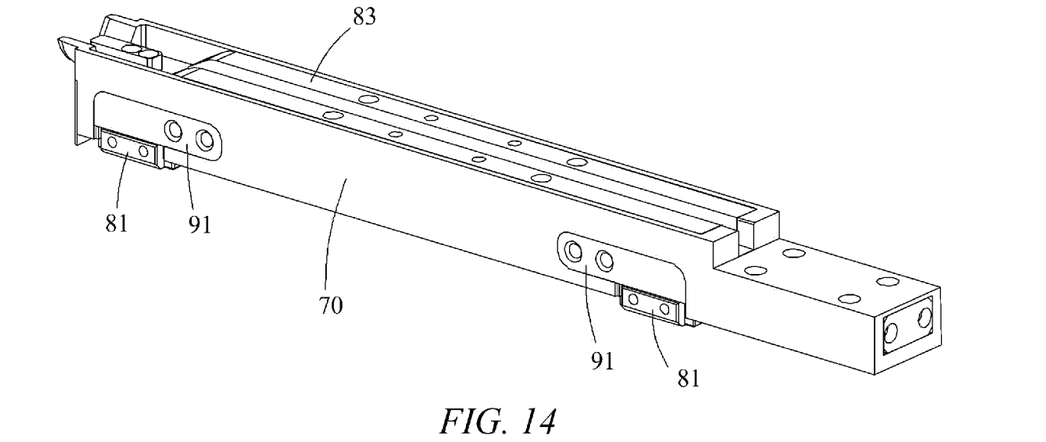
FIG. 14 is a perspective view of a supporting frame according to some embodiments of the present application.

With reference to FIG. 14, a perspective view of a supporting frame 70 according to some embodiments of the present application is shown in FIG. 14. According to some embodiments of the present application, optionally, as shown in FIGS. 4 and 14, the winding device 100 further includes: blocking members 91, where the blocking members are fixed on the supporting frames 70 and used for blocking gaps between the second sliding blocks 81 and the supporting frames 70.

The blocking members 91 are components for blockage, and the blocking members 91 are used for blocking gaps between the second sliding blocks 81 and the supporting frames 70.

Third accommodation cavities 73 (with reference to FIG. 4) for accommodating the second sliding blocks 81 are provided on the supporting frames 70, and the second sliding blocks 81 are slidably arranged in the third accommodation cavities 73 in the first direction X. The blocking members 91 may be arranged at one sides of the supporting frames 70 facing the second sliding blocks 81, that is, the blocking members 91 may be located at two sides of the second sliding blocks 81 in the third direction, and the third direction is perpendicular to the first direction X and the second direction Y. The blocking members 91 may block the gaps between the second sliding blocks 81 and the supporting frames 70, and may block the second sliding slots 811.

When the second transmission members 82 move in the first sliding slots 72 and the second sliding slots 811, since a plurality of components move relative to each other, particles may be generated due to mutual friction. If the particles fall on the electrode assembly 500, the electrode assembly 500 may be punctured by the particles, and then a yield of electrode assemblies 500 is reduced.

The gaps between the second sliding blocks 81 and the supporting frames 70 are blocked by the blocking members 91, so as to prevent particles generated through movement of the second transmission members 82 from falling into an inner ring of the electrode assembly 500 from the gaps between the second sliding blocks 81 and the supporting frames 70 and then affecting the quality of the electrode assembly 500.

According to some embodiments of the present application, optionally, the blocking members 91 are magnetic members, and the magnetic members are magnetically attracted to the supporting frames 70.

The blocking members 91 are magnetic members and may be magnetically attracted and conveniently assembled. The magnetic members may attract particles in the supporting frames 70, such that the possibility that the particles fall on the electrode assembly 500 is reduced.

According to some embodiments of the present application, optionally, the blocking members 91 may be non-magnetic members, and the blocking members 91 are detachably mounted on the supporting frames 70, for example, the blocking members 91 are mounted on the supporting frames 70 by means of threaded fasteners.

Optionally, as shown in FIG. 4, first cover plates 92 and second cover plates 93 may be arranged on two sides of the supporting frames 70 in the first direction X respectively, and the first cover plates 92 are located on one sides of the supporting frames 70 facing away from the inner pins 30 and between the supporting frames 70 and the second sliding blocks 81; and the second cover plates 93 are located on one sides of the supporting frames 70 facing the inner pins 30. Third cover plates 94 may be arranged at one ends of the supporting frames 70 facing away from the base 50 in the second direction Y, and the first cover plates 92, the second cover plates 93 and the third cover plates 94 may cover openings of the supporting frames 70, so as to prevent the particles from falling on the electrode assembly 500.

According to some embodiments of the present application, optionally, as shown in FIG. 2, a channel 74 extending in the second direction Y is formed between the pair of supporting frames 70, and one end of the channel 74 away from the base 50 is used for the second driving member 300 to be inserted, so as to drive the adjusting members 20 (with reference to FIG. 8) to move towards the base 50 in the second direction Y.

The channel 74 is a space for the second driving member 300 to move, and after the second driving member 300 is inserted into the channel 74, the second driving member 300 may move in the channel 74 in the second direction Y, so as to drive the adjusting members 20 to move in the second direction Y. Since the second driving member 300 is inserted into the channel 74 at one end of the channel 74 away from the base 50, the second driving member 300 may drive the adjusting members 20 to move towards the base 50 in the second direction Y. Optionally, the second driving member 300 may be a push rod, and the push rod is connected to the actuating end of the linear driving device, for example, the linear driving device may be an air cylinder, a hydraulic cylinder or an electric push rod, etc.

Optionally, when the second driving member 300 drives the adjusting members 20 to move towards the base 50, the second sliding blocks 81 move in the first direction X, such that the two outer pins 10 move away from each other to increase the distance between the two outer pins 10. When the second driving member 300 gradually exits the channel 74 in the second direction Y, the adjusting members 20 move away from the base 50 in the second direction Y, and the second sliding blocks 81 move in the first direction X, such that the two outer pins 10 move close to each other to reduce the distance between the two outer pins 10.

The channel 74 extending in the second direction Y is formed between the pair of supporting frames 70 such that the second driving member 300 is conveniently inserted, so that the adjusting members 20 are driven by the second driving member 300 to move in an axial direction of a winding shaft.

According to some embodiments of the present application, optionally, as shown in FIGS. 4 and 8, the winding device 100 further includes: a third transmission member 84, where the third transmission member is fixed on the adjusting members 20, at least part of the third transmission member 84 is located in the channel 74, and the third transmission member 84 is used for engaging with the second driving member 300.

One end of the third transmission member 84 is connected to the adjusting members 20, and the other end of the third transmission member 84 extends into the channel 74. The third transmission member 84 is used for applying a driving force in the second direction Y to the adjusting members 20.

Optionally, the third transmission member 84 may be of an L-shaped structure, and the third transmission member 84 may include a main body and a protruding portion. The main body extends in the first direction X, one end of the main body is connected to the adjusting members 20, and the other end of the main body extends into the channel 74. The protruding portion may extend from the main body in a direction away from the base 50, and an extending direction of the protruding portion may be parallel to that of the adjusting members 20.

The third transmission member 84 may be fixed on the adjusting members 20 by means of threaded fasteners. When the third transmission member 84 is driven by the second driving member 300 to move in the second direction Y, the adjusting members 20 may move in the second direction Y accordingly.

The third transmission member 84 engages with the second driving member 300 to transmit power to the adjusting members 20 such that the second driving member 300 may conveniently drive the adjusting members 20 to move.

According to some embodiments of the present application, optionally, as shown in FIGS. 4 and 8, the winding device 100 further includes: a second elastic returning member 85, where the second elastic returning member 85 is arranged on the supporting frames 70 and used for applying to the adjusting members 20 an elastic force in the second direction Y and facing away from the base 50, so as to return the adjusting members 20.

The second elastic returning member 85 is a component for providing an elastic force, for example, the second elastic returning member 85 may be a spring, rubber, etc. The second elastic returning member 85 applies an elastic force in the second direction Y and facing away from the base 50 to the adjusting members 20, such that the adjusting members 20 have a tendency to move in a manner of facing away from the base 50, but the adjusting members 20 are restrained by the supporting frames 70. When the second driving member 300 is inserted into the channel 74 and drives the adjusting members 20, the second driving member 300 drives the adjusting members 20 to overcome the elastic force to move towards the base 50 in the second direction Y. When the second driving member 300 moves away from the base 50, the second elastic returning member 85 applies an elastic force to the adjusting members 20 to drive the adjusting members 20 to move in a manner of facing away from the base 50, so as to conveniently return the adjusting members 20.

The second elastic returning member 85 applies the elastic force to the adjusting members 20, so as to conveniently return the adjusting members 20.

According to some embodiments of the present application, the present application provides a winding apparatus. The winding apparatus is used for winding an electrode assembly 500 and includes a winding device 100 provided in any of the above solutions, a first driving member 200 and a second driving member 300. The first driving member 200 is used for driving a pair of inner pins 30 to move, so as to clamp or release the electrode assembly 500. The second driving member 300 is used for driving adjusting members 20 to move in the second direction Y.

The first driving member 200 is used for driving the pair of inner pins 30 to move, so as to increase or reduce a distance between the pair of inner pins 30 such that the pair of inner pins 30 may release or clamp the electrode assembly 500.

The second driving member 300 is used for driving the adjusting members 20 to move in the second direction Y, and the adjusting members 20 drive the pair of outer pins 10 to move away from or close to each other, so as to increase or reduce the distance between the pair of outer pins 10.

The winding apparatus may adjust a winding circumference of the pair of outer pins 10, a yield of prepared electrode assemblies 500 is high, and a manufacturing cost is low.

According to some embodiments of the present application, optionally, the winding apparatus further includes: a detection device, where the detection device is used for obtaining a tab misalignment amount of the electrode assembly 500. The first driving member 200 is configured to drive the adjusting members 20 to move according to the tab misalignment amount obtained by the detection device, so as to adjust the distance between the pair of outer pins 10.

The detection device obtains the tab misalignment amount of the electrode assembly 500, so as to conveniently control tab misalignment information. The first driving member 200 drives the adjusting members 20 to move according to the tab misalignment amount obtained by the detection device, so as to automatically adjust the winding circumference of the pair of outer pins 10.

Figure 15:
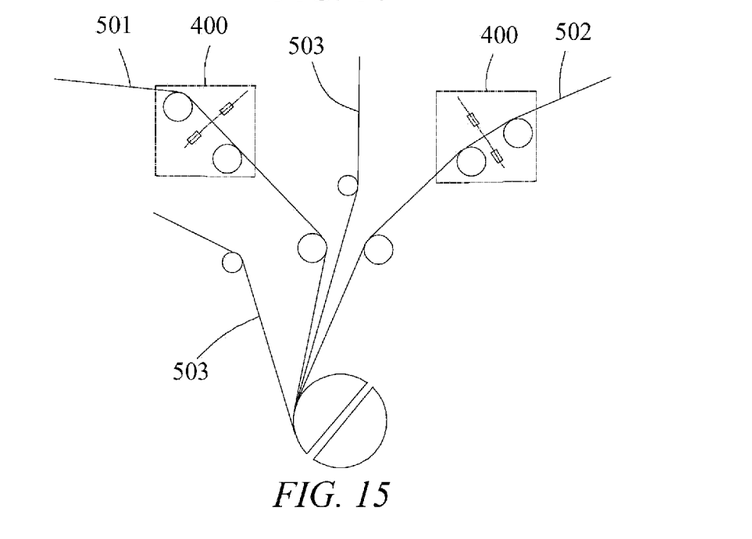
FIG. 15 shows a schematic diagram of a method for adjusting tab misalignment according to some embodiments of the present application.

FIG. 15 shows a schematic diagram of a method for adjusting tab misalignment according to some embodiments of the present application. In the figure, a separator 503, a first electrode plate 501, a separator 503 and a second electrode plate 502 are stacked and wound around the winding device 100, and before the first electrode plate 501 and the second electrode plate 502 enter the winding device 100, the first electrode plate 501 and the second electrode plate 502 pass through the detection device 400 respectively. The first electrode plate 501 and the second electrode plate 502 have opposite polarities, for example, the first electrode plate 501 may be a positive plate, and the second electrode plate 502 may be a negative plate.

The present application provides a winding method. The winding method is used for winding an electrode assembly 500 and includes: obtaining a tab misalignment amount of an electrode assembly 500; and adjusting a distance between a pair of outer pins 10 according to the tab misalignment amount.

The tab misalignment amount of the electrode assembly 500 is obtained by the detection device 400. The detection device 400 may detect and predict the tab misalignment amount of the wound electrode assembly 500 by detecting a tab winding angle or by detecting an electrode plate thickness. The tab misalignment amount may be obtained by means of a corresponding deviation between an actual encoder value and a template encoder value, that is, the tab misalignment amount may be computed by detecting a deviation between an actual diaphragm thickness and a standard diaphragm thickness, a corresponding deviation between an actual winding angle and a template angle of a tab, and a corresponding deviation between an actual encoder value and the template encoder value of a tab. For example, a method for detecting tab misalignment by a tab winding angle is as follows: detecting a winding angle of a designated tab by a detection device 400, comparing the winding angle with a standard angle, and computing a tab misalignment amount in real time, so as to automatically online detect a tab misalignment amount and a tab misalignment direction of a multi-tab electrode assembly 500.

Assuming that a tab misalignment amount of a $n^{th}$ tab from inside to outside is $X_n$, a tab winding angle of the $n^{th}$ tab is $Q_n$, a standard tab winding angle of the $n^{th}$ tab is $Q_n{}'$, a circumference of the pair of outer pins 10 is C, and a thickness of a wound electrode assembly 500 is T, the tab misalignment amount of the $n^{th}$ tab is $$X_n = \frac{\theta_n - \theta_n'}{360}(2nT\pi + C).$$

An algorithm for an adjustment amount ΔL of a winding circumference is as follow: a tab misalignment amount of a previous electrode assembly 500 is $X=X_n$, the number of turns of the wound electrode assembly 500 is N, and a tab misalignment adjustment coefficient is K (0.2<K<1), then, $\Delta L = K\, L_m/N$.

Therefore, the winding circumference may be automatically adjusted, solving the problems that the winding circumference is adjusted by manually tearing and pasting teflon and the winding circumference may not be adjusted in a timely manner, such that loss of a yield due to tab misalignment of an apparatus is reduced, and utilization of a winding apparatus is improved.

The winding device 100 and the winding apparatus may be applied to a winding production scenario of the electrode assembly 500.

Although the present application has been described with reference to preferred embodiments, various improvements can be made thereon, and equivalents can be used for replacing components thereof without departing from the scope of the present application. In particular, technical features mentioned in the embodiments can be combined in any manner as long as no structural conflict exists. The present application is not limited to specific embodiments disclosed herein but includes all technical solutions that fall within the scope of the claims.

What is claimed is:

1. A winding device, comprising:
   a pair of outer pins, wherein the pair of outer pins are oppositely arranged in a first direction, and a periphery of the pair of outer pins is used for an electrode assembly to be wound around;
   adjusting members, wherein the adjusting members are configured to reciprocate in a second direction to drive the pair of outer pins to move away from or close to each other, to increase or reduce a distance between the pair of outer pins, and the second direction is perpendicular to the first direction;
   a pair of inner pins, wherein the pair of inner pins are arranged between the pair of outer pins, the pair of inner pins are oppositely arranged in the first direction, and the pair of inner pins are configured to move independent of the adjusting members, to clamp or release the electrode assembly;
   an elastic returning member, wherein the elastic returning member is configured to apply an elastic force in the first direction to at least one of the pair of inner pins, such that the pair of inner pins have a tendency to be close to each other;
   a base, wherein the pair of outer pins and the pair of inner pins are mounted on the base; and
   a pair of supporting frames, wherein the pair of supporting frames are oppositely arranged in the first direction and are fixed on the base;
   wherein the pair of inner pins are located between the pair of supporting frames, the adjusting members are mounted on the supporting frames, the pair of outer pins correspond to the pair of supporting frames one by one, and each of the pair of outer pins is arranged outside a corresponding supporting frame of the pair of supporting frames and movably connected to the corresponding supporting frame in the first direction.

2. The winding device according to claim 1, wherein the pair of inner pins comprise a first inner pin and a second inner pin, the first inner pin is fixed on the base, the second inner pin is movably mounted on the base and configured to move in the first direction, and the elastic returning member is configured to apply the elastic force to the second inner pin.

3. The winding device according to claim 2, wherein the first inner pin and the second inner pin extend in the second direction, an accommodation cavity is provided on the base, one end of the first inner pin and one end of the second inner pin extend into the accommodation cavity, and the elastic returning member is arranged in the accommodation cavity.

4. The winding device according to claim 3, wherein a through hole in communication with the accommodation cavity is provided on the base, and the through hole is used for insertion of a driving member configured to drive the second inner pin to overcome the elastic force to move.

5. The winding device according to claim 4, further comprising:
   a guiding member, wherein the guiding member is fixed in the accommodation cavity; and
   a sliding block, wherein the sliding block is slidably connected to the guiding member and slidable in the first direction; and
   one end of the second inner pin is connected to the sliding block.

6. The winding device according to claim 5, further comprising:
   a transmission member, wherein the transmission member is mounted on the sliding block and configured to engage with the driving member to drive the sliding block to move along the guiding member.

7. The winding device according to claim 6, wherein the transmission member comprises a roller, and an inclined surface matching the roller is arranged on the driving member.

8. The winding device according to claim 1, wherein the adjusting members comprise two adjusting members corresponding to the pair of outer pins one by one, and each of the two adjusting members is movably connected to a corresponding one of the pair of supporting frames in the second direction.

9. The winding device according to claim 8,
   wherein accommodation cavities are provided on the supporting frames, the adjusting members are slidably arranged in the accommodation cavities, first sliding slots in communication with the accommodation cavities are provided on the supporting frames and extend in the second direction;
   the winding device further comprising:
      sliding blocks, wherein the sliding blocks are movably connected to the supporting frames in the first direction, the outer pins are fixed on the sliding blocks, second sliding slots corresponding to the first sliding slots are provided on the sliding blocks, and the second sliding slots are provided in an inclined manner relative to the first sliding slots; and
      transmission members, wherein the transmission members are connected to the adjusting members and in sliding fit with the first sliding slots and the second sliding slots.

10. The winding device according to claim 9, wherein the transmission members comprise rollers.

11. The winding device according to claim 9, wherein at least two of the sliding blocks are arranged on each of the pair of supporting frames in a spaced manner in the second direction.

12. The winding device according to claim 9, further comprising:

blocking members, wherein the blocking members are fixed on the supporting frames and configured to block gaps between the sliding blocks and the supporting frames.

13. The winding device according to claim 12, wherein the blocking members comprise magnetic members, and the blocking members are magnetically attracted to the supporting frames.

14. The winding device according to claim 1, wherein a channel extending in the second direction is formed between the pair of supporting frames, and one end of the channel away from the base is used for insertion of a driving member configured to drive the adjusting members to move towards the base in the second direction.

15. The winding device according to claim 14, further comprising:
a transmission member, wherein the transmission member is fixed on the adjusting members, at least part of the transmission member is located in the channel, and the transmission member is configured to engage with the driving member.

16. The winding device according to claim 14,
wherein the elastic returning member is a first elastic returning member;
the winding device further comprising:
a second elastic returning member, wherein the second elastic returning member is arranged on the supporting frames and configured to apply to the adjusting members an elastic force in the second direction and facing away from the base, to return the adjusting members.

17. A winding apparatus, comprising:
the winding device according to claim 1;
a first driving member, wherein the first driving member is configured to drive the pair of inner pins to move, to clamp or release the electrode assembly; and
a second driving member, wherein the second driving member is configured to drive the adjusting members to move in the second direction.

* * * * *